United States Patent [19]
Cragun et al.

[11] Patent Number: 5,804,803
[45] Date of Patent: Sep. 8, 1998

[54] MECHANISM FOR RETRIEVING INFORMATION USING DATA ENCODED ON AN OBJECT

[75] Inventors: Brian John Cragun; Wayne Jay Rothschild, both of Rochester, Minn.

[73] Assignee: International Business Machines Corporation, Armonk, N.Y.

[21] Appl. No.: 627,744

[22] Filed: Apr. 2, 1996

[51] Int. Cl.[6] .............................. G06K 7/10; G06F 17/00; G06F 7/00
[52] U.S. Cl. ......................... 235/375; 235/462; 395/600
[58] Field of Search ..................................... 235/462, 472, 235/379, 454, 494; 395/500, 600, 601

[56] References Cited

U.S. PATENT DOCUMENTS

| | | | |
|---|---|---|---|
| 4,500,880 | 2/1985 | Gomersall et al. | 340/825.35 |
| 4,780,599 | 10/1988 | Baus | 235/383 |
| 4,916,441 | 4/1990 | Gombrich | 340/712 |
| 5,250,789 | 10/1993 | Johnsen | 235/383 |
| 5,280,609 | 1/1994 | MacPhail | 395/600 |
| 5,345,071 | 9/1994 | Dumont | 235/383 |
| 5,359,698 | 10/1994 | Goldberg et al. | 395/2.1 |
| 5,448,046 | 9/1995 | Swartz | 235/383 |
| 5,490,217 | 2/1996 | Wang et al. | 235/462 |
| 5,600,833 | 2/1997 | Senn et al. | 395/601 |

OTHER PUBLICATIONS

IBM Technical Disclosure Bulletin, vol. 35, No. 1A, Jun. 1992, pp. 315–318, "Portable Self–Checkout Retail System".

Business Week, Mar. 18, 1996, p. 63, "The Only Book You'll Ever Need?".

*Primary Examiner*—Donald T. Hajec
*Assistant Examiner*—Thien Minh Le
*Attorney, Agent, or Firm*—Owen J. Gamon

[57] ABSTRACT

A client computer with a scanner capable of scanning objects for a code. The client computer scans the object of interest and translates the code into a URL (Uniform Resource Locator) that specifies both a server computer and the location within the server of information that is relevant to the object. The client computer transmits the URL to the server computer, receives the information related to the object from the server computer, and communicates the information to the customer.

21 Claims, 14 Drawing Sheets

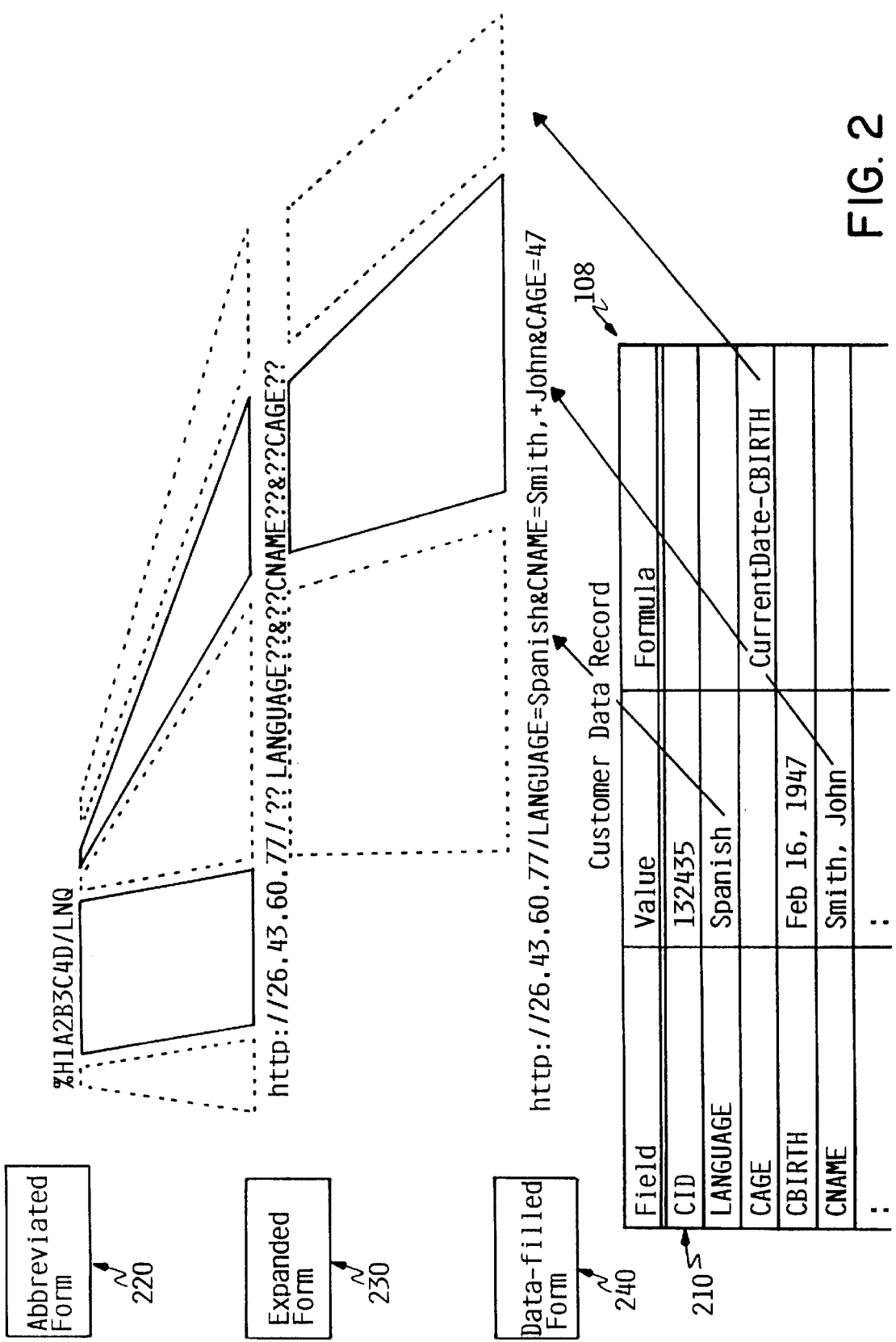

Product Database

| UPC | Product Name | Unit Price | URL Information |
|---|---|---|---|
| 12345-67890 | Yummy Chicken Soup | $0.65 | http://yummy.corp.com/??LANGUAGE?? |
| 23456-78901 | Sweet Powdered Sugar | $2.09 | %H04125D6F/LGQK |
| 34567-89012 | Peanut Butter | $3.79 | http://peanut.food.com/??CID??&??SID??&??SIP?? |
| .. | .. | .. | .. |

FIG. 3

| Information | Expansion | Separator | Token | Type |
|---|---|---|---|---|
| Customer Gender | ??CSEX?? | & | G | 1 char |
| http:// expansion | http:// | | H | literal |
| Customer Income | ??CINCOME?? | & | I | 10 char |
| Customer Marital Status | ??CMARS?? | & | J | 1 char |
| Customer Children Info | ??CHILD?? | & | K | 30 char, Ages/Sex |
| Preferred Language | ??LANGUAGE?? | & | L | 1 char |
| Customer e-mail | ??CEMAIL?? | & | M | 40 char |
| Customer Name | ??NAME?? | & | N | 35 char |
| Customer Occupation | ??COCCUP?? | & | O | 20 char |
| Customer Phone | ??CPHONE?? | & | P | 10 digit |
| Customer Age | ??CAGE?? | & | Q | Calculated |
| Customer Credit Rating | ??CCREDIT?? | & | R | 30 char |
| Store ID | ??SID?? | & | S | 30 char |
| Store IP Address | ??SIP?? | & | T | 4 bytes |
| Customer Home Page URL | ??CURL | & | U | 50 char |
| Customer Address | ??CADDR?? | & | V | 50 char (variable) |
| Customer ID | ??CID?? | & | W | 10 char |
| Transaction ID | ??TID?? | & | X | 20 char |
| Customer Dietary Info | ??CDIET?? | & | Y | 255 char |
| Customer ZIP | ??CZIP?? | & | Z | 9 digit |
| modal character | | | % | token |
| slash | | | / | literal |
| period | | | . | literal |
| dash | | | - | literal |
| hex values | | | 0-9,A-F | hex values |

FIG. 4

MECHANISM FOR RETRIEVING INFORMATION USING DATA ENCODED ON AN OBJECT

FIELD OF THE INVENTION

This invention relates to the information processing field. More particularly, this invention relates to an information retrieval mechanism for obtaining information related to an object based on data encoded on the object.

BACKGROUND

Consumers often feel a great need for information about products and services that are offered for sale. This could include a need for such things as price, size, weight, expiration date, nutritional information, instructions for use, product applications, warranty, warnings, rating by independent testing organizations, product demonstrations or samples, service information, and background, biographical or historical information about the creator, service provider, manufacturer, or seller.

While some of the desired information may be easily attached to the relevant product or easy to supply as part of the service, consumers can still have an unfilled need for accurate, up to date, relevant, and appropriate information because:

1. Space may be limited on the product package or display;
2. The information may be changing rapidly, and obsolete information might be useless, misleading, or even dangerous;
3. All information may not be appropriate for all viewers; and
4. There may even be too much information, and viewers need assistance in sorting through the available information to find the information that is relevant to their needs. For example, there is an enormous amount of information available on the Internet, but it is often difficult for consumers to find and even more difficult for consumers to tie the information in the Internet to the product in which they are interested.

Just as consumers may have a great need for information about products and services, retailers, distributors, packagers, and service providers may be aware of these needs and may wish to provide information to consumers in order to increase sales and profits. Knowing which consumers show an interest in which products, regardless of whether the products are purchased or not, may help the provider towards a wiser use of marketing resources. Also, knowing more about what information consumers desire may help providers decide what, if any, changes might be needed in product or service function and quality in order to improve consumer acceptance of the product or service. Thus, obtaining information about why consumers choose not to buy a product or service may be even more important than obtaining information about those consumers who do choose to buy a particular product or service. Further, different customers need different information. In order for a product or service provider to provide relevant information to the consumer, the provider must first obtain information from the consumer about the consumer's needs.

For the foregoing reasons, there is a need for a mechanism for enhanced information delivery about products and services to consumers based on the preferences and needs of customers.

SUMMARY

It is an object of the present invention to provide an enhanced information retrieval mechanism for obtaining information related to an object based on data encoded on the object.

It is a further object to provide an enhanced information retrieval mechanism for obtaining information related to an object based on data encoded on the object and based on customer information.

It is a further object to provide an enhanced information retrieval mechanism for obtaining information related to an object based on data encoded on the object where the encoded data represents an abbreviated URL (Uniform Resource Locator).

These and other objects are achieved by a client computer with a scanner capable of scanning objects for a code. The client computer scans the object of interest and translates the code into a URL that specifies both the server computer and the location within the server of information that is relevant to the object. The client computer transmits the URL to the server computer, receives the information related to the object from the server computer, and communicates the information to the customer.

BRIEF DESCRIPTION OF THE DRAWINGS

FIG. 2 is a block diagram that shows an example of converting a code in abbreviated form to its expanded form and its data-filled form using data from a customer data base, according to the preferred embodiment.

FIG. 3 is a data structure that shows an example of a product database, according to the preferred embodiment.

FIG. 4 is a table that shows a list of the abbreviations used for the abbreviated form of a Uniform Resource Locator (URL) and examples of how entries in the abbreviated form are converted to an expanded form and a data-filled form, according to the preferred embodiment.

DETAILED DESCRIPTION OF PREFERRED EMBODIMENT

As a general overview, a client computer and a server computer are connected in a network. The client computer contains a scanner that is capable of scanning objects for a code. The client computer scans the object of interest to the customer and translates the code into a URL (Uniform Resource Locator) that specifies both the server computer and the location within the server of information that is relevant to the object. The client computer transmits the URL to the server computer, receives the information related to the object from the server computer, and displays the information to the customer.

Figure 1A:
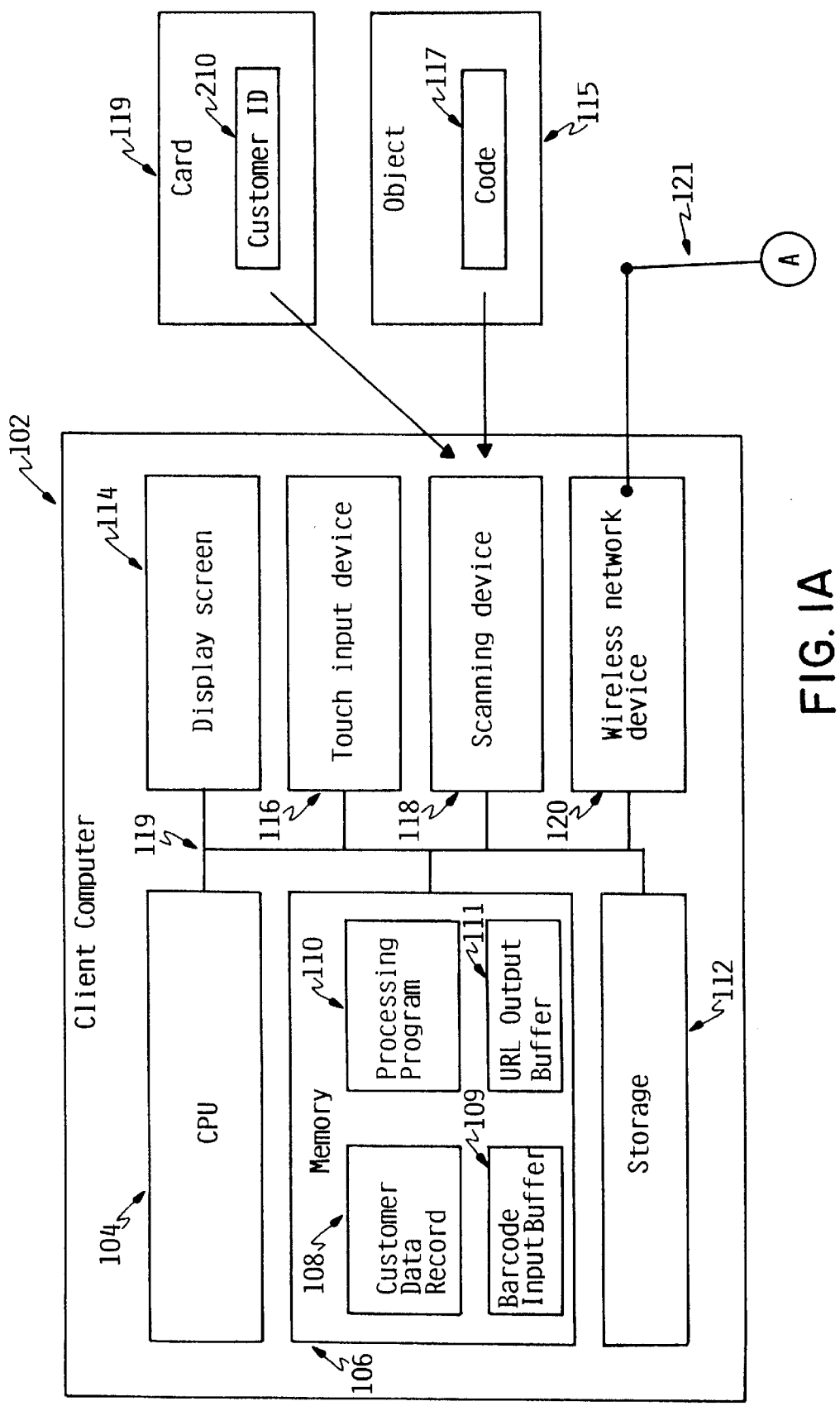
FIG. 1 is a block diagram that shows a client computer attaching to a local server computer, a network, and a remote server computer, according to the preferred embodiment.
Figure 1B:
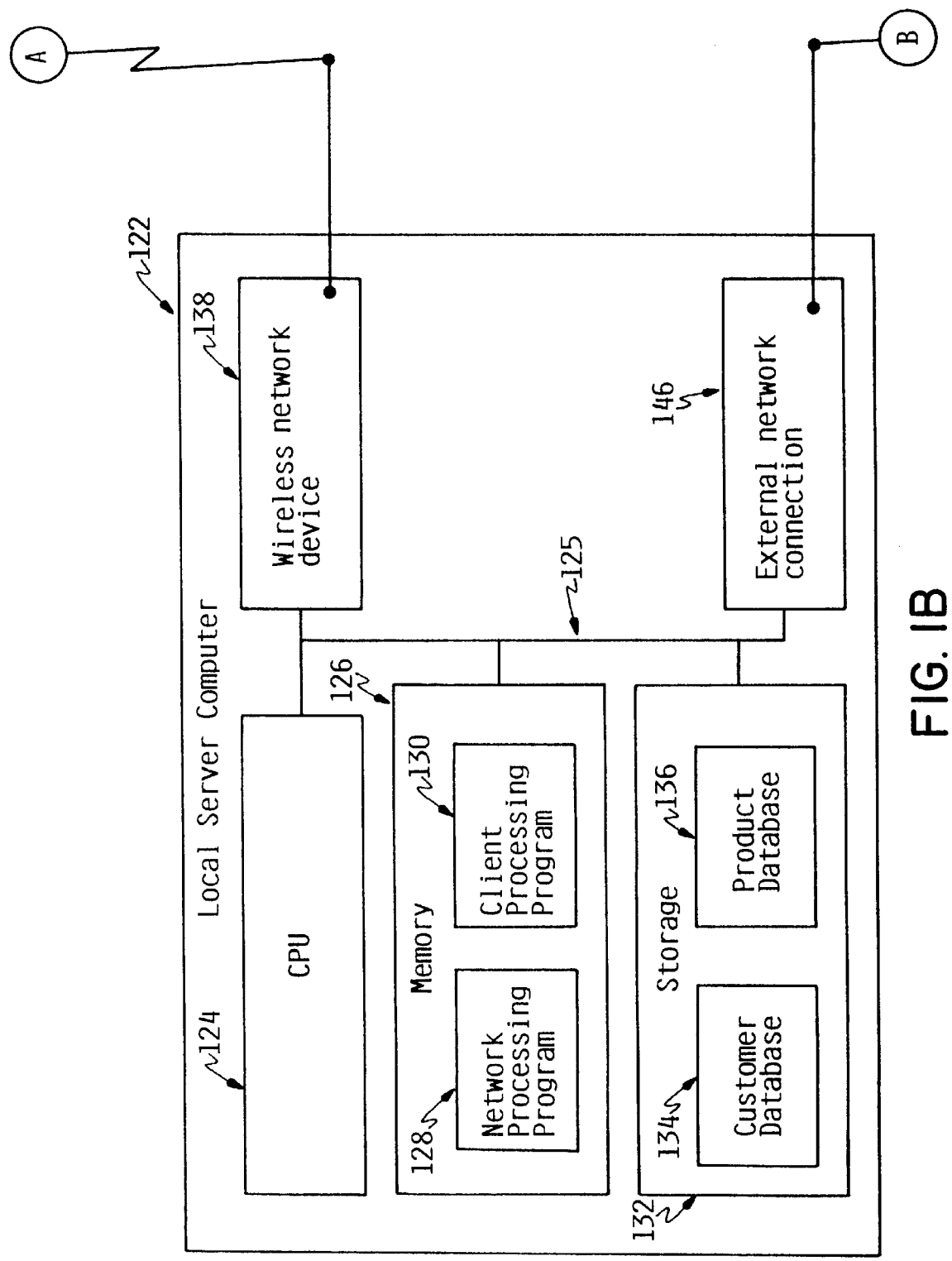
Figure 1C:
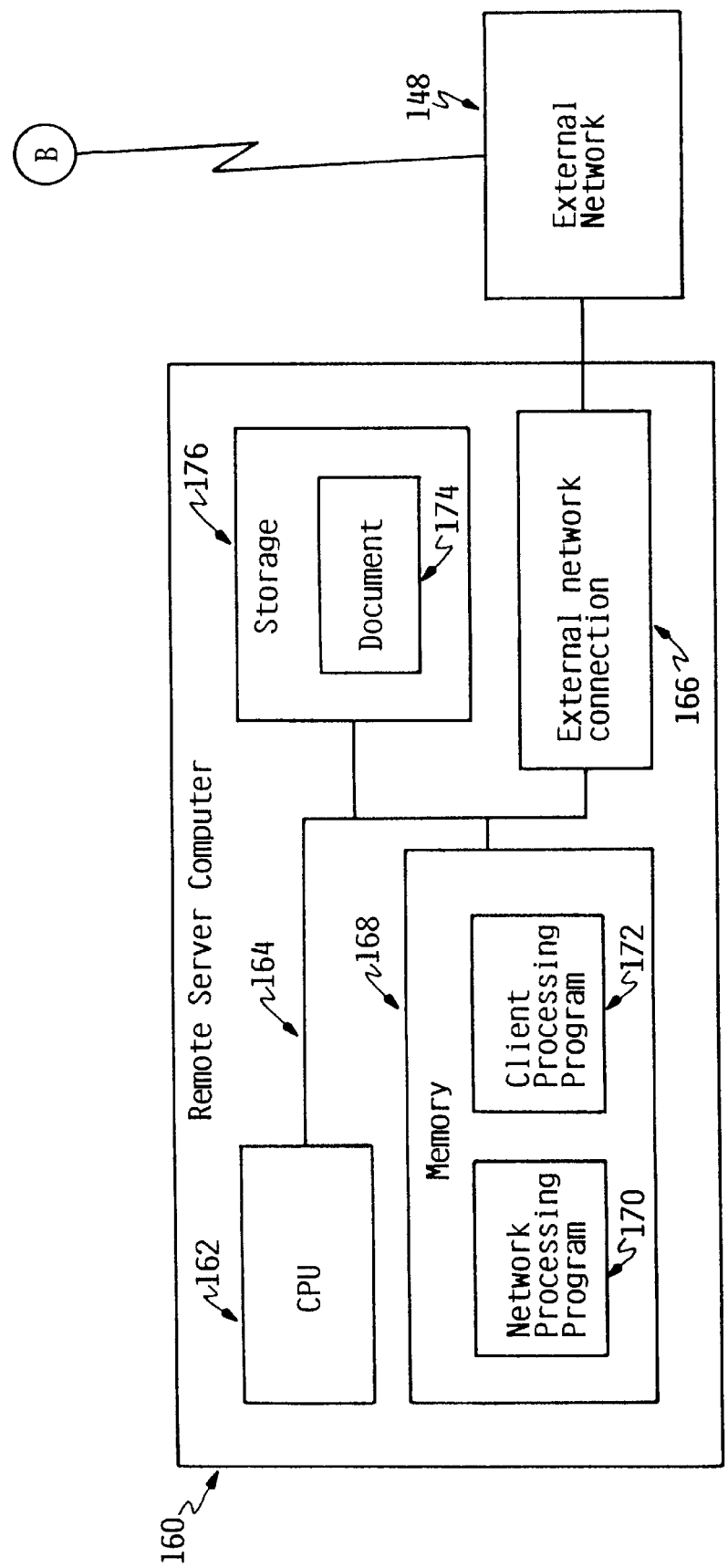

With reference now to the figures and in particular with reference to FIG. 1, there is depicted a block diagram of a data processing system in which a preferred embodiment may be implemented. Computer 122 functioning as a local server is shown. Local server computer 122 contains Central Processing Unit (CPU) 124, which is a processor connected via bus 125 to wireless network device 138, external network connection 146, memory 126 and storage 132.

Memory 126 is a random access memory sufficiently large to hold the necessary programming and data structures.

While memory 126 is shown as a single entity, it should be understood that memory 126 may in fact comprise a plurality of modules, and that memory may exist at multiple levels, from high-speed registers and caches to lower speed but larger DRAM chips. Memory 126 contains network processing program 128 and client processing program 130. Network processing program 128 contains instructions that, when executed on CPU 124, provide support for connecting local server computer 122 to local area network (LAN) 121 and to external network 148. Client processing program 130 contains instructions that, when executed on CPU 124, provide support for responding to requests from clients, such as client 102. The contents of memory 126 can be loaded from and stored to storage 132 as CPU 124 has a need for it.

Storage 132 contains customer database 134 and product database 136. Customer database 134 contains information about customers, keyed on their customer identifier (CID) 210, as will be described later under the description for FIG. 2. Product database 136 contains information about products as will be described later under the description for FIG. 3. In the preferred embodiment, storage 132 is DASD (Direct Access Storage Device), although it could also be other storage such as floppy disk drives, tape drives, removable memory cards, or optical storage. While storage 132 is depicted as a single entity, it should be understood that storage 132 may in fact comprise a plurality of storage devices.

Local server computer 122 may be implemented using any suitable server computer such as the AS/400® computer system, fitted with Wireless LAN Adapter FC2668 and running the OS/400® operating system, all products of International Business Machines Corporation, located in Atmonk, N.Y. In the preferred embodiment, external network connection 146 is a TCP/IP network connection, although it could be any type of suitable network connection. Local server computer 122 is connected to external network 148 via high-speed telephone lines or by wireless communications, and connects via wireless network device 138 to LAN 121, which connects to client computer 102. In the preferred embodiment, LAN 121 is wireless, although communications wires could also be used. External network 148 contains at least one remote server computer.

Client computer 102 connects to LAN 121 via wireless network device 120 and sends and receives information to and from local server computer 122. Wireless network device 120 could use a TCP/IP connection. Client computer 102 can be any suitable computing device such as the PTC-1144 Pen-Based Computer, fitted with a SelectTouch ™ touch screen, an integrated visible red scanning laser, and an AIRONET™ real-time 2.4 GH spectrum transceiver, a product of the Telxon Corporation, located in Akron, Ohio. In the preferred embodiment, client computer 102 is portable and hand-held.

Client computer 102 contains Central Processing Unit (CPU) 104 connected via bus 119 to display screen 114, input device 116, scanning device 118, wireless network device 120, memory 106, and storage 112. Scanning device 118 is capable of reading code 117 from object 115 and customer identifier (CID) 210 from customer card 119. Object 115 is a tangible object of interest to the customer, about which the customer desires to find out more information.

Customer card 119, which the customer uses to check out client computer 102, is issued to the customer by the store that offers object 115 for sale. When the store issues customer card 119 to the customer, the customer fills out personal information, which becomes part of customer database 134. When the customer checks out client computer 102, the current customer data is received from customer database 134 at local server computer 122, using customer identifier 210 as a key, as will be further described under the description for FIG. 5.

In the preferred embodiment, scanning device 118 is a laser scanning bar code reader and code 117 is a bar code. As is well known in the art, a scanning bar code reader contains a light source and an optical system scanning the light produced by a light source, to direct it to the bar code to be detected, and to direct the reflected light to a transducer. This is followed by conversion into electrical signals with a suitable evaluating circuit. A bar code can be considered as a series of vertical bars varying in width and spacing that such a scanning bar code reader is capable of reading as digital information.

Input device 116 can be any means for the customer to give input to client computer 102. For example, a keyboard, keypad, light pen, touchscreen, button, mouse, trackball, or speech recognition unit could be used. Display screen 114 could be any other suitable output device, such as a text to speech converter, printer, or an audio player. Although input device 116 is shown as being separate from display screen 114, they could be combined; for example, a display with an integrated touchscreen, a display with an integrated keyboard, or a speech recognition unit combined with a text to speech converter could be used.

Memory 106 includes customer data record 108, processing program 110, barcode input buffer 109, and URL output buffer 111. Customer data record 108 is loaded from customer database 134 on local server computer 122 as will be explained later under the description for FIG. 5. Barcode input buffer 109 stores code information read by scanning device 118 from object 115, as will be further described under the description for FIG. 6. URL output buffer 111 contains a URL that processing program 110 converted from code 117, as will be explained below under the description for FIGS. 6, 7, 8, and 9. In the preferred embodiment, barcode input buffer 109 and URL output buffer 111 are within the program space of processing program 110, although they could be anywhere in memory accessible by processing program 110.

CPU 104 is suitably programmed by processing program 110 as is further described in the description for FIGS. 5, 6, 7, 8, and 9. In the alternative, the function of FIGS. 5, 6, 7, 8, and 9 could be implemented by control circuitry through the use of logic gates, programmable logic devices, or other hardware components in lieu of a processor based system.

Processing program 110 also contains instructions that, when executed on CPU 104, provide support for connecting client computer 102 to LAN 121 via wireless network device 120 and sending and receiving data to and from server computers. In the alternative, this network support function could be provided by a separate program.

In the preferred embodiment, storage 112 is DASD (Direct Access Storage Device), although it could also be other storage such as floppy disk drives or optical storage. Although storage 112 is shown as a single entity unit, it could be any combination of fixed and/or removable storage devices, such as fixed disk drives, floppy disk drives, tape drives, removable memory cards, or optical storage. The contents of memory 106 can be loaded from and stored to storage 112 as needed by CPU 104. Memory 106 and storage 112 could be part of one virtual address space spanning multiple primary and secondary storage devices.

In the preferred embodiment, client computer device 102 uses the Microsoft MS-DOS 6.22 operating system and PenDOS, and the application environment of Microsoft Windows for Pen Computing and Microsoft Visual Basic. However any appropriate operating system and application environment that allows code reading could be used.

Computer 160 functioning as a remote server is shown. Remote server computer 160 contains Central Processing Unit (CPU) 162, which is a processor connected via bus 164 to external network connection 166, memory 168 and storage 176.

Memory 168 is a random access memory sufficiently large to hold the necessary programming and data structures. While memory 168 is shown as a single entity, it should be understood that memory 168 may in fact comprise a plurality of modules, and that memory may exist at multiple levels, from high-speed registers and caches to lower speed but larger DRAM chips. Memory 168 contains network processing program 170 and client processing program 172. Network processing program 170 contains instructions that, when executed on CPU 162, provide support for connecting remote server computer 160 to external network 148 via external network connection 166. Client processing program 172 contains instructions that, when executed on CPU 162, provide support for responding to requests from clients, such as client 102 or local server 122. The contents of memory 168 can be loaded from and stored to storage 176 as CPU 162 has a need for it.

Storage 176 contains document 174, which contains information related to object 115. Document 174 is identified by the URL in URL output buffer 111 created by processing program 110 from code 117, as will be further described under the description for FIG. 6.

Client computer 102, local server computer 122, and remote server 160 could be other types of computer systems, whether they be microcomputers such as an Apple Macintosh or mainframe computers such as an IBM System/390, and still fall within the spirit and scope of this invention. In addition, client computer 102, local server computer 122, and remote server 160 could be a microcomputer or mini-computer such as described above but connected to a larger computer system. It will be readily appreciated that the principles of the invention may apply to other computer applications, such as other mainframes, minicomputers, network servers, supercomputers, personal computers, or workstations, as well as other electronics applications. Therefore, while the discussion herein focuses on a particular application, the invention should not be limited to the particular hardware designs, software designs, communications protocols, performance parameters, or application-specific functions disclosed herein.

FIG. 2 shows an example of how the data from code 117 is converted after scanning device 118 reads code 117 from object 115 into barcode input buffer 109. Processing program 110 converts code 117 in barcode input buffer 109 into a URL in URL output buffer 111, and then ultimately sends the URL to network 148 via local server computer 122. A URL (Uniform Resource Locator) is the citation system for the Internet, and it identifies the location address (both the server name and the location within the server) of the document of interest. The standard format for an Internet URL is "service://server name/path name/file name." This standard format is frequently too long to be of practical use for printing with a bar code. In the preferred embodiment, a URL is represented in three possible forms: abbreviated form 220, expanded form 230, or data-filled form 240.

Either abbreviated form 220 or expanded form 230 could be encoded on object 115, depending on the space available in code 117.

Abbreviated form 220 is shorter than either expanded form 230 or data-filled form 240, making abbreviated form 220 more suitable for encoding in bar-codes. In abbreviated form 220, a modal character (percent sign "%" in the preferred embodiment) indicates that the following information is abbreviated by tokens. In the example of FIG. 2, the "H" is an abbreviation for "http://", the first eight hexadecimal digits are converted by processing program 110 to a 32-bit number which represents the Internet Protocol (IP) Address, the "/" is the slash literal, the letter "L" represents a query about the preferred language of the customer, the letter "N" represents a query about the customer's name, and the letter "Q" represents a query about the customer's age. A list of the abbreviations used in the preferred embodiment for abbreviated form 220 and their mapping by processing program 110 to expanded form 230 are further described in FIG. 4.

Continuing with FIG. 2, processing program 110 converts abbreviated form 220 to expanded form 230 to contain the full IP address and the places in the URL representing requests for information that should be sent with the URL when it is sent to network 148. As can be seen in the example, "H" is indeed replaced by "http://", the hexadecimal string "1A2B3C4D" has been converted and replaced with the standard decimal octuplet "26.43.60.77" representing the IP address, and the slash has been transferred literally as "/". The L, N, and Q have been replaced with the long form of their queries: ??LANGUAGE??, ??CNAME?? and ??CAGE??, respectively, and have been separated by ampersands "&". The conversion from abbreviated form 220 to expanded form 230 is more fully described under the description for FIG. 7.

Expanded form 230 may or may not have query fields. In expanded form 230, the tokens have been replaced by their expansion, and literals have been transferred unmodified. If expanded form 230 does not have query fields, then expanded form 230 is in the standard URL format. If expanded form 230 contains query fields, then the URL is complete except that the data fields need to be filled in with customer specific data from customer data record 108.

An example of expanded form URL 230 that has embedded query fields is illustrated in FIG. 2. Processing program 110 fills in expanded form 230 with data to create data-filled form 240. As shown in the example, the ??LANGUAGE?? keyword has been replaced with the field identifier and field value "LANGUAGE=Spanish". The field values come from customer data record 108, which was loaded to client computer 102 when the customer first checked it out. In a similar manner, the ??CNAME?? keyword has been replaced with the field identifier and field value "CNAME=Smith,+John", the value also coming from customer data record 108, and the value being modified in a manner consistent with the industry custom of replacing a blank (" ") with a plus-sign ("+") in URL strings.

Finally the ??CAGE?? keyword is replaced with the field identifier and field value "CAGE=47", a value which is not in customer data record 108, but which is calculated from the current date and the customer birth date from customer data record 108, using a formula provided for that value (subtracting the birth date from the current date), as depicted in the illustration of customer data record 108. Thus, processing program 110 can manipulate the data from customer data record 108 before it is sent with the URL.

In this way, a URL is capable of being encoded on object 115 and expanded by processing program 110. The information that is received by processing program 110 into barcode input buffer 109 is thus translated into a URL in URL output buffer 111 and personalized for the specific customer via substitution of fields from customer data record 108. The URL in URL output buffer 111 is now ready to be sent from client computer 102 to external network 148 via local server computer 122. The URL could address any server in external network 148, such as remote server 160. Alternatively, the URL could also address a location in local server computer 122. The conversion of expanded form 230 to data-filled form 240 is more fully described under the description for FIG. 8.

While URL abbreviated form 220 is advantageous for encoding a URL string in a bar code because of the limited characters per inch which can be encoded in a bar code, expanded form 230 can also be used directly in a bar code, if the number of characters allow it. Similarly, additional IP Address qualifiers, such as sub directories, which are common in Internet addresses, can be encoded in the URL string. Such additional address qualifiers are allowed in abbreviated form 220 by use of the "%" modal character, the detection of which in barcode input buffer 109 causes processing program 110 to switch back and forth between abbreviated mode and literal expanded mode.

FIG. 3 shows a data structure that depicts an example of product database 136 at local server 122. Product database 136 is referenced when scanned code 117 represents a Universal Product Coding (UPC) symbol rather than a URL string or an abbreviated URL string, as shown in blocks 608–614 in FIG. 6. A UPC symbol is a way of encoding data using bar codes.

Product database 136 is keyed on UPC number and contains a variety of information including product name 315, unit price 320, and URL information 325, which can be used to provide information about the product. URL information 325 can either be in abbreviated form 220 or expanded form 230, as explained above under the description for FIG. 2. Product database 136 can also contain a variety of other information (not shown) such as the aisle or room location where object 115 is located. Some of the information in product database 136 is specific to the particular store where the customer is located, such as unit price 320, while other information in product database 136 could be common to multiple stores in a chain.

FIG. 4 is a table showing examples of how processing program 110 maps abbreviated form 220 to expanded form 230 and data-filled form 240. The entries in token column 440 appear in abbreviated form 220 and are mapped to the corresponding entry in expansion column 420 when processing program 110 converts abbreviated form 220 to expanded form 230. Processing program 110 uses the entries in separator column 430 to separate the values in expansion column 420 when creating expanded form 230. Type column 450 contains the ultimate type of each token in data-filled form 240. Information column 410 contains textual descriptions for each row.

Figure 5:
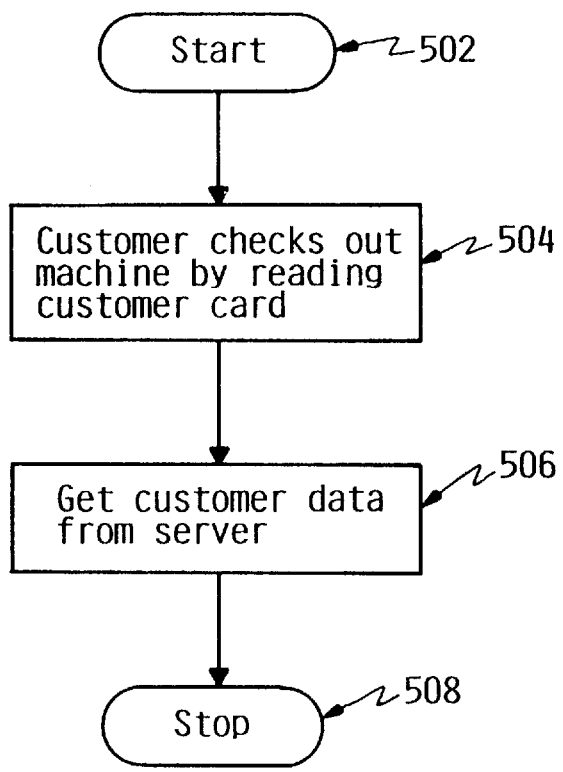
FIGS. 5, 6, 7, 8, and 9 are flowcharts that describe the operation of a processing program, according to the preferred embodiment.

FIG. 5 depicts the flowchart of the process whereby client computer 102 is prepared for use by the customer. Entry is depicted in block 502. In block 504, processing program 110 uses scanning device I 18 to read customer ID 210 from a bar code on customer card 119. Customer card 119, which the customer uses to check out client computer 102, is issued to the customer by the store. When the store issues the card to the customer, the customer fills out personal information, which becomes part of customer database 134. In block 506, processing program 110 requests data about the customer from customer data base 134 on local server computer 122, using customer ID 210 as a key and brings this data to customer data record 108 of client computer 102.

Figure 6A:
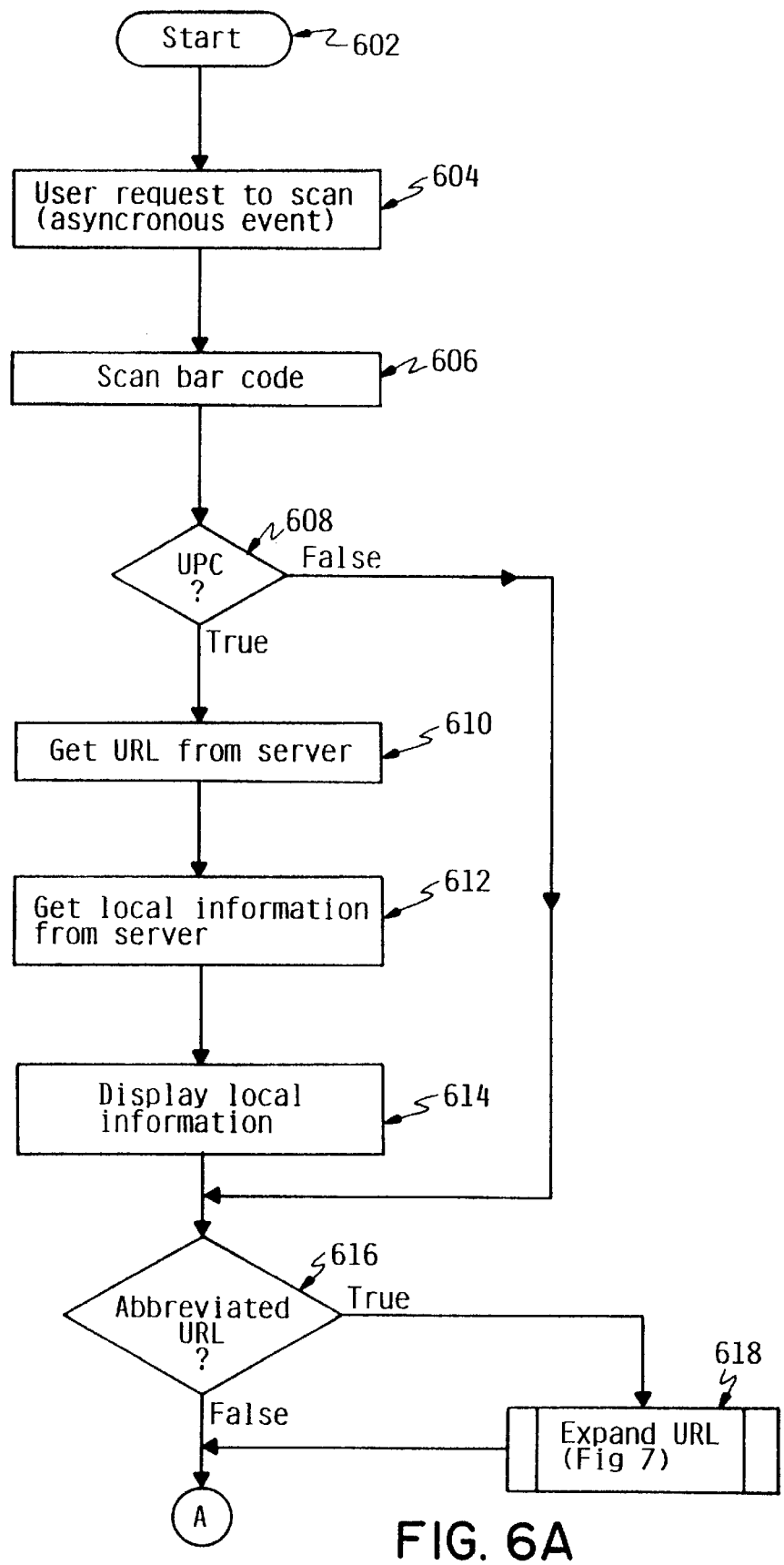
Figure 6B:
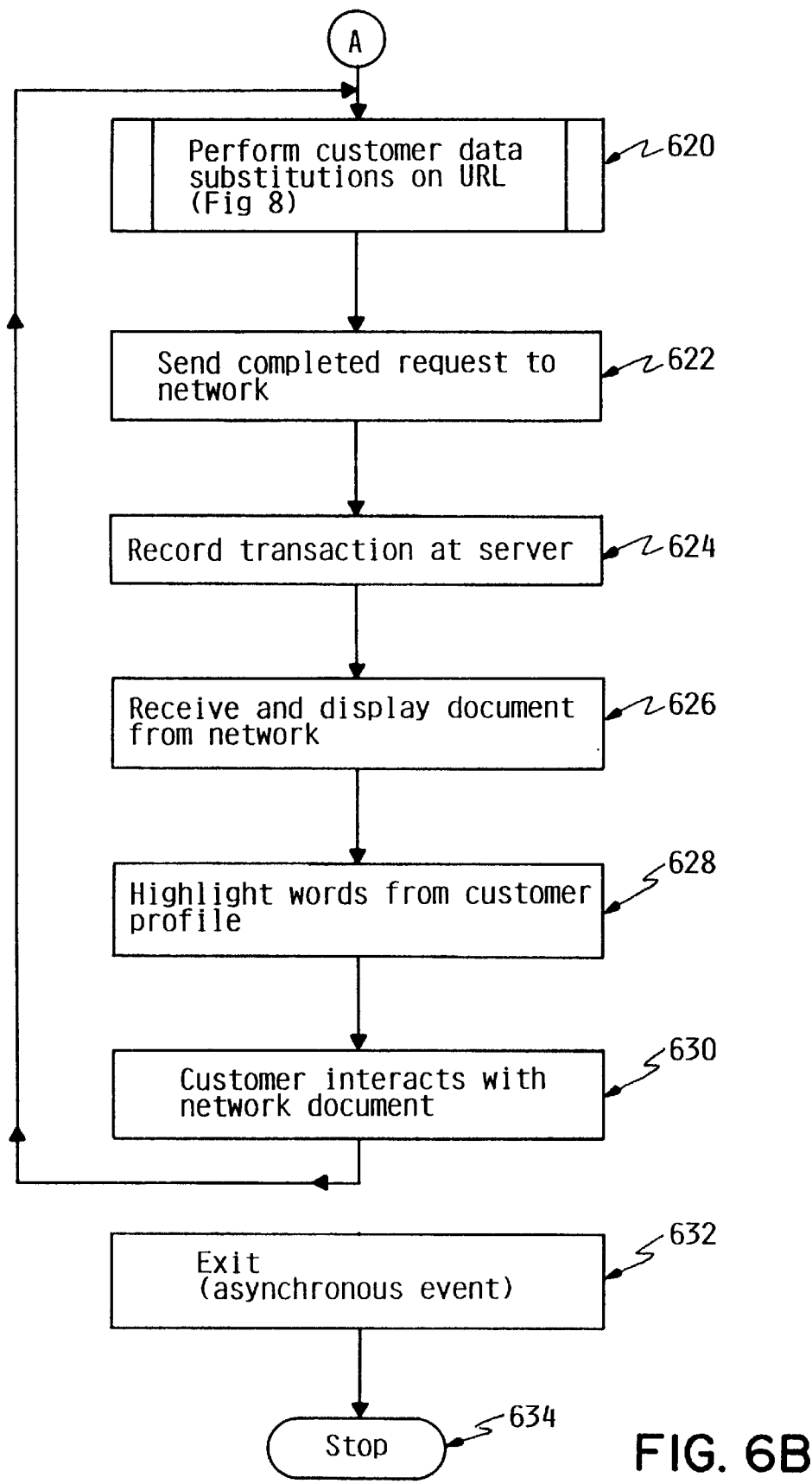

FIG. 6 depicts the processing at client computer 102 that occurs as the customer uses client computer 102 to obtain product information. Upon entry in block 602, the customer has already checked out client computer 102, and customer data record 108 has already been loaded to client computer 102, as previously explained under the description associated with FIG. 5. In block 604, the customer requests to scan code 117 using input device 116. This indication could be done by choosing an option on a menu, by pressing a key on a keypad, by pressing a button, or other method common in the art. Alternatively, the customer could indicate a request to scan a code by merely passing scanning device 118 over bar code 117 without using input device 116. At block 606, in response to this request, processing program 110 uses scanning device 118 to scan code 117 from object 115 into code input buffer 109. At block 608, if code 117 is not a UPC symbol, processing program 110 proceeds to URL processing at block 616. However, if code 117 is a standard UPC symbol, processing program 110 requests URL information 325 stored in product database 136 from local server computer 122 using UPC as an index into product database 136, as shown in block 610, and optionally obtains local information, such as current price (block 612) and displays the displayable information, such as the local price, to the customer (block 614) via display screen 114.

When the processing flow reaches block 616, processing program 110 has a URL string, which may or may not be in abbreviated form 220. At block 616, processing program 110 checks whether the URL string is in abbreviated form 220. If the URL string is in abbreviated form 220, processing program 110 expands the URL to expanded form 230 at block 618, as described in more detail under the description for FIG. 7.

When process flow reaches block 620, processing program 110 has obtained a URL in expanded form 230, which may or may not have embedded query fields. In block 620, processing program 110 fills in any embedded query fields to create datafilled form 240, as depicted in greater detail under the description for FIG. 8.

Continuing to block 622, processing program 110 sends the completed URL via wireless network device 120 over LAN 121 to local server computer 122 for processing. Network processing program 128 sends the completed URL to external network 148 via external network connection 146. As the URL is sent, network processing program 128 records the transaction, as shown in block 624. When document 174 requested by the completed URL returns to client computer 102 from remote server 160, it is received by processing program 110 via wireless network device 120 and displayed on display screen 114, as shown in block 626. Optionally, in block 628, processing program 110 highlights on display screen 114 the information indicated by customer data record 108 to be of interest to the customer. This information may be of any sort, but one salient example is to highlight words of a dietary nature, such as ingredients to which the customer is allergic.

Next, in block 630, the customer interacts with the document. In the preferred embodiment, the document is a HTML World Wide Web page, which could contain other URLs of documents the customer could request or a fill-in form for other customer information not available in the customer data base. In addition, the URLs contained in the document might be in expanded form 230, such that additional interaction by the customer might utilize additional detail from customer database 134 to create additional URLs in data-filled form 240. Thus, the URL encoded on the object can point to a brief amount of customer and product information, and yet allow the capability to query remote documents at length and extract even greater amounts of information than are practical in an initial pre-specified query.

Processing program 120 now returns to block 620, and loops continuously, processing the URLs in the document, which could themselves be in expanded form, until at any point in the process, the customer requests to exit, as depicted in block 632. Finally, in block 634, processing is completed.

Figure 7A:
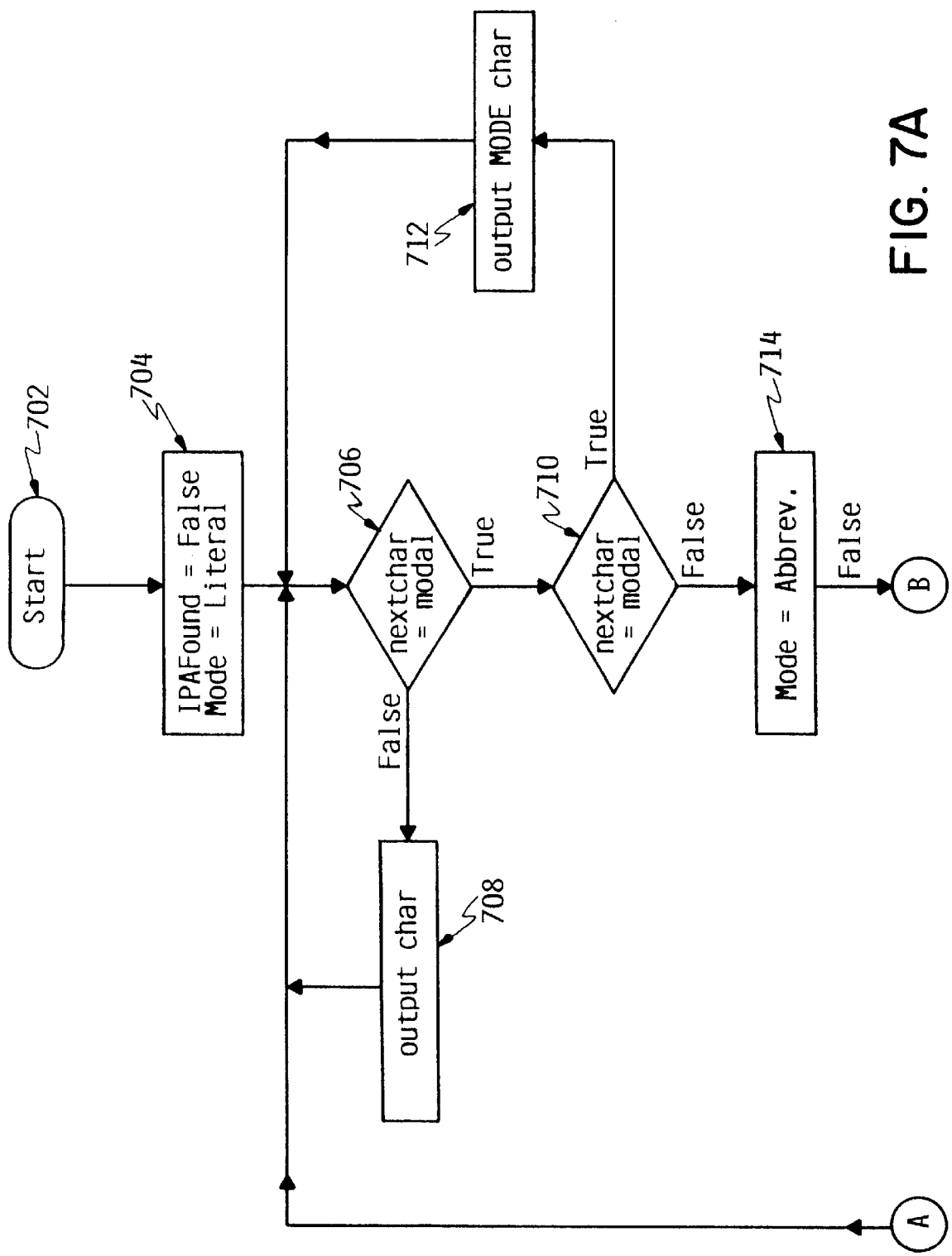
Figure 7B:
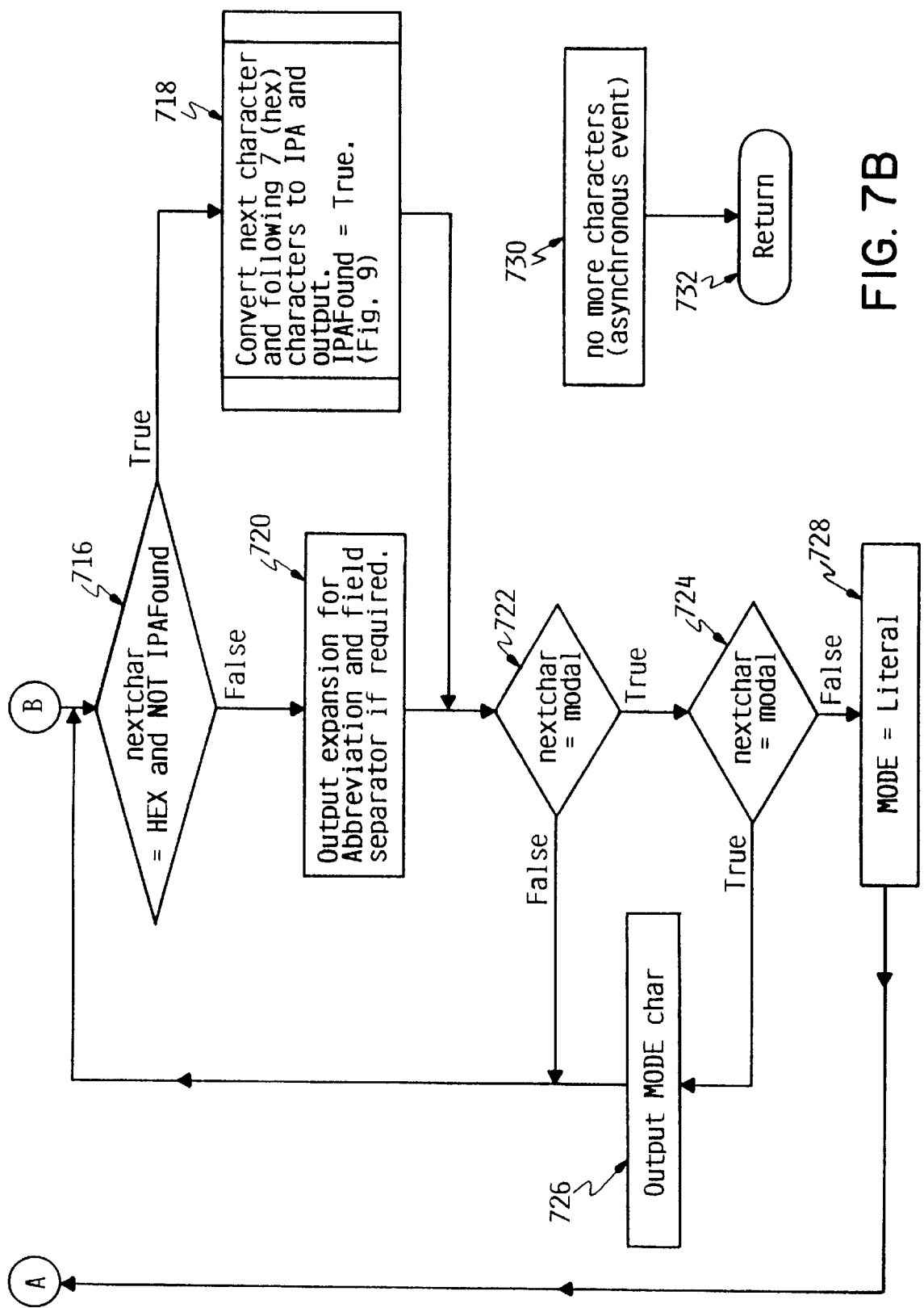

FIG. 7 depicts the processing of expanding abbreviated URL form 220 to expanded URL form 230. Entry is depicted in block 702, when a modal character ("%") has been observed. In block 704, the processing program 110 sets the value IPAFound, which indicates whether the Internet Protocol Address has yet been found, to false, and sets the variable Mode to Literal, meaning that the next series of characters are not abbreviated and should be used as found, rather than being expanded. At block 706, processing program 110 tests the next character in the abbreviated URL string to see if it is the special modal character ("%") which, when found alone, shifts the mode between Literal and Abbreviate. If the next character is not the modal character, processing program 110 outputs the character to URL output buffer 111 without changes, as shown in block 708, after which flow returns to block 706. Otherwise, if the next character is the modal character at block 706 (always the case on first entry to the code), processing program 110 tests the following character at block 710 to see if it is also the modal character (block 710), in which case processing program 110 outputs the modal character itself to URL output buffer 111 (block 712) and flow returns to block 706.

If the check at block 710 is false, then only one modal character was found, so processing program 110 continues to block 714, where processing program 110 sets the variable Mode to Abbrev, indicating that the next series of characters are abbreviations for the actual information that should be sent to the output buffer 111. At block 716, processing program 110 checks if the next character in the input stream is a hexadecimal character and the IP Address is not yet found. If this check is true, flow transfers to block 718, where processing program 110 interprets the character and the following seven hexadecimal characters as a 32-bit address and converts them to an industry standard IP address in standard octuplet form, as is further explained under the description for FIG. 9. Also, processing program 110 sets IPAFound to true. Flow then continues to block 722.

If, in block 716, the next character is not hexadecimal, or the IP Address has already been found, flow continues to block 720, where processing program 110 replaces the character in URL output buffer 111, as shown in FIG. 2, by its expansion (FIG. 4). If the expansion will become a field, and other field expansions have already been processed, a separator character "&" is output preceding the output of the expansion string (not shown), since all field expansions except the first one must be preceded by a field separator, as shown in block 720. Flow then continues to block 722.

In block 722, still in Abbreviation mode, processing program 110 checks to see if the next character is a modal character. If the modal character is not found, processing program 110 returns to block 716. If the modal character is found, processing program 10 checks the following character at block 724 to see if it is also the modal character. If a second modal character is found, processing program 110 outputs the modal character a single time at block 726. Otherwise, if only one modal character was found (the check by processing program 110 at block 724 is false), processing program 110 changes the variable Mode back to Literal at block 728 and flow returns to block 706 for literal processing. If at any point there are no more characters to process as shown in block 730, processing stops at block 732, and control returns to the calling procedure, block 618 of FIG. 6.

Figure 8:
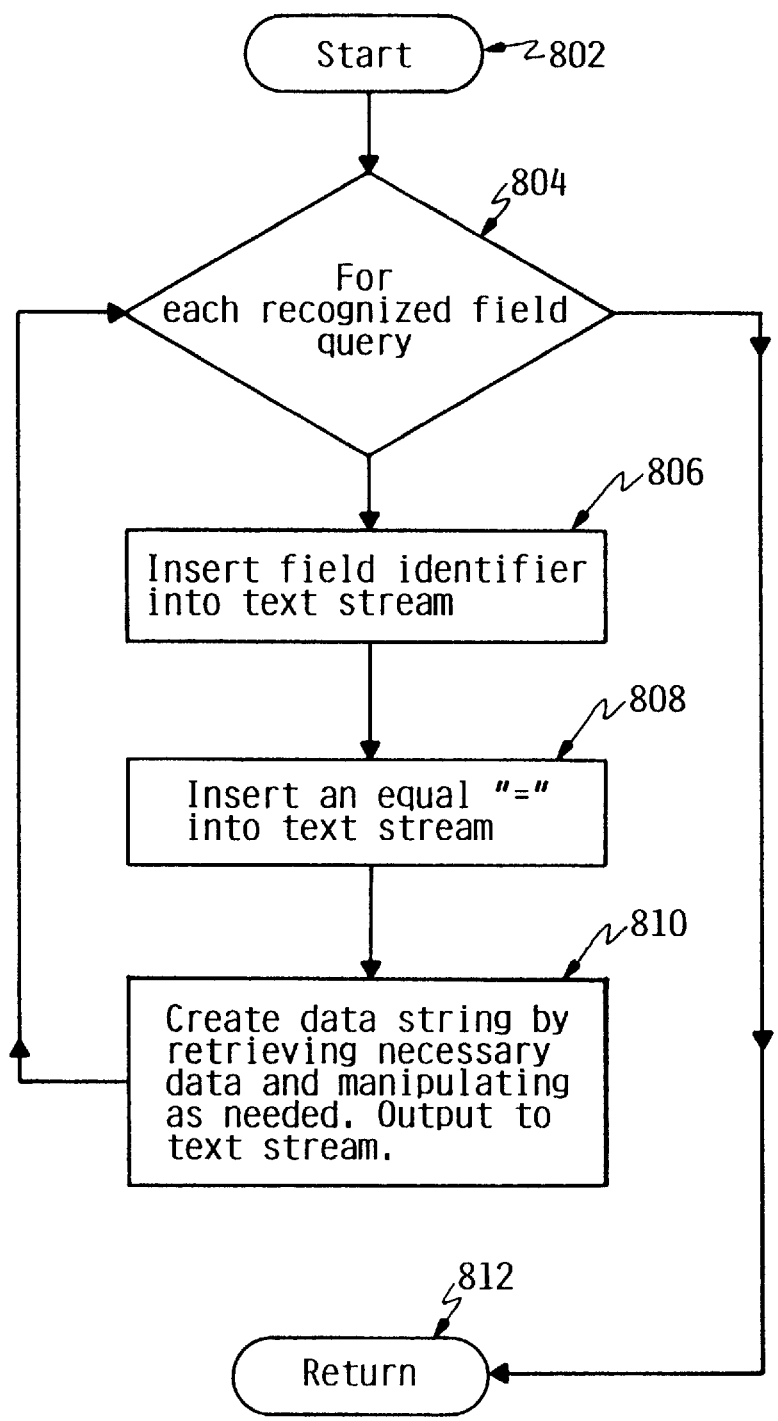

FIG. 8 depicts the processing of converting expanded URL form 230 to datafilled URL form 240. Processing starts in block 802. Processing program 110 parses the URL string looking for known field query expansions. In the preferred embodiment, processing program 110 identifies field query expansions by keywords surrounded by double question marks ("??"), as shown in FIG. 2. For each one that is found by processing program 110 at block 804, the field identifier is inserted into the text stream at block 806. At block 808, processing program 110 inserts an equal sign into the text stream. At block 810, processing program 110 creates a the data string for the field query created and outputs it to the text stream. As previously described under the description for FIG. 2, the data string may be a verbatim copy of the data, or may be a calculated value, based on available customer data and/or other available information. In some cases, this is done by simply taking the customer data value and outputting it to the text stream, as is the case with a Zip-code. In some cases, the customer data must receive special formatting, as is the case with the customer name, where plus "+" must be substituted for any blanks, according to standards for URLs. In some cases the customer data must be manipulated to produce the query. A case of this is the customer age, which may vary over time. Only the customer birth date is kept in the customer database, thus the age on any given date must be calculated. Any variety of calculations could be done on the data and still be within the spirit and scope of the invention. When there are no more recognized field queries at block 804, the flow of processing program 110 branches to block 812, where control returns to the calling procedure at block 620 of FIG. 6.

Figure 9:
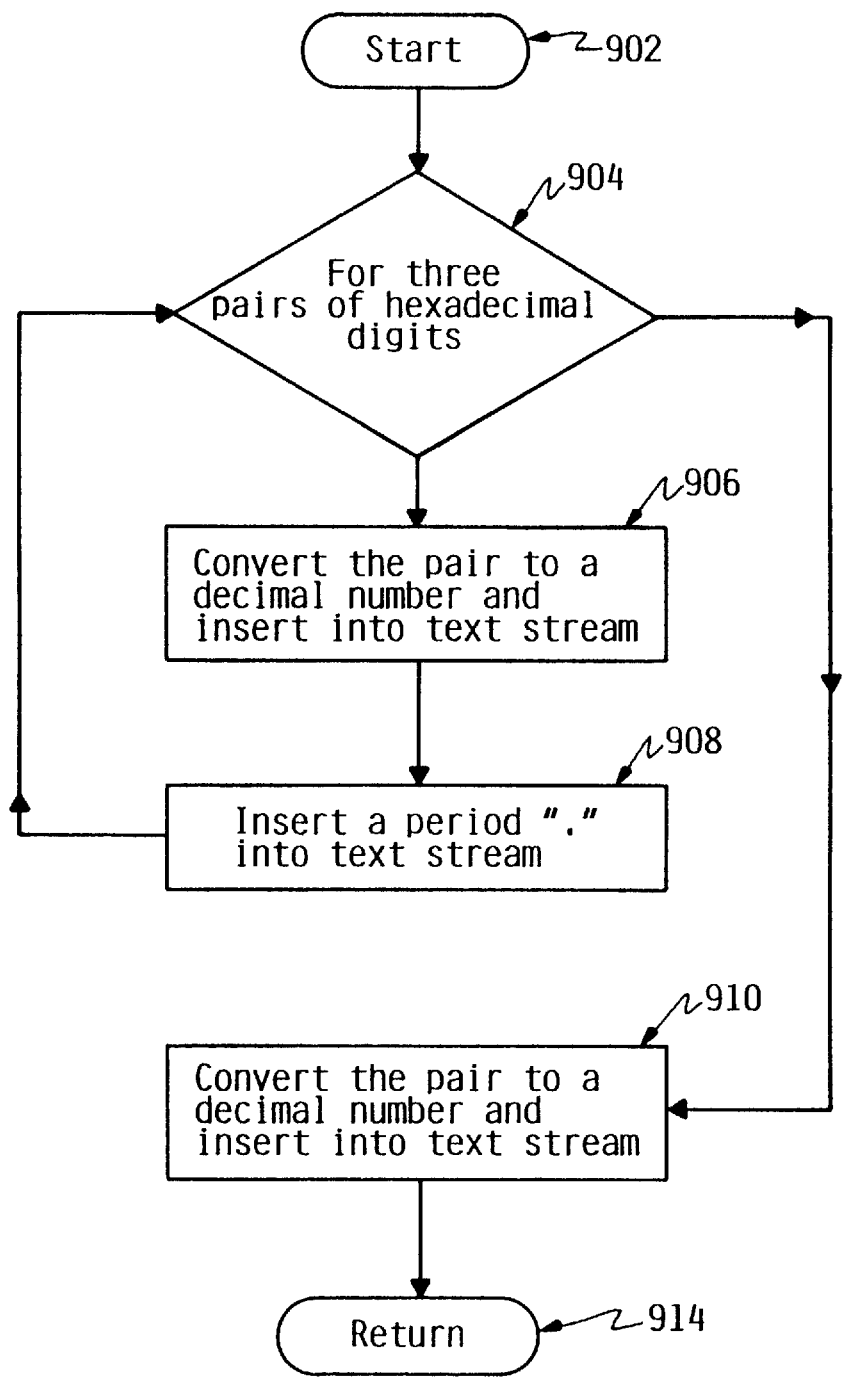

FIG. 9 depicts the conversion process for creating an IP Address from eight hexadecimal digits, and its flow is invoked from block 718 of FIG. 7. Upon entry at block 902, processing program 110 continues to a loop that starts at block 904, where the first three pairs of hexadecimal digits are processed, a pair at a time. For each pair of hexadecimal digits, in block 906, processing program 110 converts the pair to a decimal number and inserts it into the text stream. Next in block 908, processing program 110 inserts a period (".") into the text stream. After processing for the first three pairs of hexadecimal numbers is complete, processing program 110 continues in block 910, where processing program 110 converts the final pair of hexadecimal digits to decimal and inserts them in the text stream. At block 914, control is returned to the calling procedure at block 718 of FIG. 7.

Figure 10:
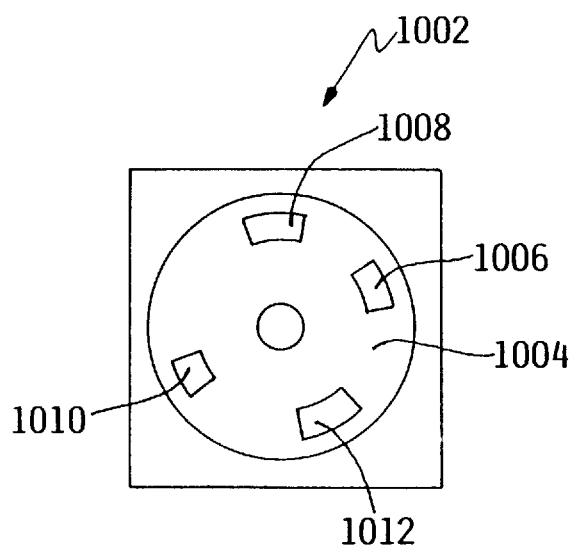
FIG. 10 is a block diagram of an article of manufacture or a computer program product including a storage medium for storing thereon program means for carrying out the processing program, according to the preferred embodiment.

FIG. 10 shows an article of manufacture or a computer program product including a storage medium for storing thereon program means for carrying out the method of this invention in the system of FIG. 1. It is important to note that while the present invention has been described in the context of a computer system, that those skilled in the art will appreciate that the mechanisms of the present invention are capable of being distributed as a program product in a variety of forms, and that the present invention applies equally regardless of the particular type of signal bearing media used to actually carry out the distribution. Examples of signal bearing media include: recordable type media such as floppy disks and CD ROMs and transmission type media such as digital and analog communications links.

An example of such an article of manufacture is illustrated in FIG. 10 as prerecorded floppy disk 1002. Floppy disk 1002 is intended for use with a data processing system, and includes magnetic storage medium 1004, and program means 1006, 1008, 1010, and 1012 recorded thereon, for directing processing program 110 to facilitate the practice of this invention. It will be understood that such apparatus and articles of manufacture also fall within the spirit and scope of this invention.

While this invention has been described with respect to the preferred and alternative embodiments, it will be understood by those skilled in the art that various changes in detail may be made therein without departing from the spirit, scope, and teaching of the invention. For example, the client computer could attach to a server computer via communications or telephone line instead of a wireless connection.

Further, while in the preferred embodiment client computer 102 is portable and hand-held, client computer 102 could be neither portable nor hand-held, such that the customer brings object to the client computer instead of bringing the client computer to the objects.

Further, the invention is not restricted to the retail store environment with customers or to codes on products, but instead is applicable to scanning a code from any object in a variety of situations by a user. For example in the medical environment, URLs could be encoded on medicine bottles to provide the doctor or pharmacist information about recommended dosage, warnings, links to medical textbooks that describe the ailment that is being treated. In the entertainment industry, URLs on compact disks could provide information to the customer about the recorded songs, the performers, fan clubs. An encoded URL on a sports team program could be used to link to statistical information about the individual players or the team. A URL encoded on objects in a museum could link to a detailed description of the object, its historical significance, and biographical information about its creator. Multiple URLs could be encoded in books, which could link to associated information, such as to footnote or bibliographical references. URLs encoded on food packages could link to storage, freezing, and preparing advice and use in recipes. A URL could be encoded on a business card to obtain information about the business.

Further, instead of presenting received information to the customer on a display device, the client computer could use a text to speech conversion device or could play an audio recording.

Further, the customer database is not required to be on a server computer attached to the client computer via a LAN. The customer database could be on any computer in the external network by translating the customer id to a URL to find the computer that contains the customer database. In an alternative embodiment, even the customer id is translated into a URL, so that the customer database and the product database are not required to be attached to a LAN but instead could be any server in the external network.

Further, the client computer and the local server computer could be the same computer.

Further, processing program 110 could execute at local server computer 122 while client computer 102 merely functions to scan object 115 and card 119 and transmit the data to local server computer 122.

Further, the scanning device is not restricted to optical technology capable of reading bar codes. Any suitable method of encoding data on, and retrieving data from, a tangible object could be used. For example, scanning device 118 could be an optical character reader that is capable of reading characters printed on object 115. Other technologies, such as magnetic encoding or radio frequency tags could also be used. Also, the customer could type numerical digits representing the code on the object instead of scanning the object.

Accordingly, the herein disclosed invention is to be limited only as specified in the following claims.

What is claimed is:

1. A method in a client computer system for retrieving a document, comprising the machine executed steps of:

scanning data encoded on an object;

creating a uniform resource locator (URL) from said scanned encoded data, wherein said URL identifies a first server connected to said client computer system via a network and a location of said document on said first server, and wherein said URL is created from information retrieved from a second server using said scanned encoded data as a key into said information and wherein said creating step further comprises creating said URL by substituting values into said scanned encoded data from a customer data record wherein said customer data record is retrieved to said client computer system from said second server;

transmitting said URL to said first server; and receiving said document from said first server wherein said document is different from said object.

2. The method of claim 1 wherein said client computer system and said second server are the same computer system.

3. The method of claim 1 wherein said client computer system and said second server are different computer systems and said client computer system is connected to said second server via said network.

4. The method of claim 1 wherein said encoded data is encoded on said object as a bar code.

5. The method of claim 1, wherein said creating step further comprises using said scanned encoded data as a key into a database located in said second server, wherein said database contains said URL.

6. The method of claim 1 wherein said substituted values further comprise at least one of the following: a language preference, a user age, and a user name.

7. The method of claim 1 wherein said substituted values are calculated from a formula contained in said customer data record.

8. An apparatus in a client computer system for retrieving a document, comprising:

means for scanning data encoded on an object;

means for creating a uniform resource locator (URL) from said scanned encoded data, wherein said URL identifies a first server connected to said client computer system via a network and a location of said document on said first server, and wherein said URL is created from information retrieved from a second server using said scanned encoded data as a key into said information and wherein said creating means further comprises creating said URL by substituting values into said scanned encoded data from a customer data record wherein said customer data record is retrieved to said client computer system from said second server;

means for transmitting said URL to said first server; and means for receiving said document from said first server wherein said document is different from said object.

9. The apparatus of claim 8 wherein said client computer system and said second server are the same computer system.

10. The apparatus of claim 8 wherein said client computer system and said second server are different computer systems and said client computer system is connected to said second server via said network.

11. The apparatus of claim 8 wherein said encoded data is encoded on said object as a bar code.

12. The apparatus of claim 8, wherein said creating means further comprises using said scanned encoded data as a key into a database located in said second server, wherein said database contains said URL.

13. The apparatus of claim 8, wherein said substituted values further comprise at least one of the following: a language preference, a customer age, and a customer name.

14. The apparatus of claim 8, wherein said substituted values are calculated from a formula contained in said customer data record.

15. A program product, comprising:

means for creating a uniform resource locator (URL) from encoded data scanned from an object, wherein said URL identifies a first server connected to a client computer system via a network and a location of a document on said first server, and wherein said URL is created from information retrieved from a second server using said scanned encoded data as a key into said information and wherein said creating means further comprises creating said URL by substituting values into said scanned encoded data from a customer data record wherein said customer data record is retrieved to said client computer system from said second server;

means for transmitting said URL to said first server;

means for receiving said document from said first server wherein said document is different from said object; and signal bearing media bearing said scanning means, said transmitting means, and said receiving means.

16. The program product of claim 15 wherein said client computer system and said second server are the same computer system.

17. The program product of claim 15 wherein said client computer system and said second server are different computer systems and said client computer system is connected to said second server via said network.

18. The program product of claim 15 wherein said encoded data is encoded on said object as a bar code.

19. The program product of claim 15, wherein said creating means further comprises using said scanned encoded data as a key into a database located in said second server, wherein said database contains said URL.

20. The program product of claim 15 wherein said substituted values further comprise at least one of the following: a language preference, a customer age, and a customer name.

21. The program product of claim 15 wherein said substituted values are calculated from a formula contained in said customer data record.

* * * * *